United States Patent Office 3,207,645
Patented Sept. 21, 1965

3,207,645
PROCESS FOR THE PREPARATION OF LAMINAR STRUCTURE CONSISTING OF POLYSTYRENE AND POLYESTER
Georges Collardeau and Claude Tourniaire, both of Lyon, France, assignors to Rhone Poulenc S.A., Paris, France, a French body corporate
No Drawing. Filed Apr. 17, 1961, Ser. No. 103,211
Claims priority, application France, May 9, 1960, 826,626
4 Claims. (Cl. 156—279)

This invention relates to a new process for the production of laminar structures, optionally reinforced, comprising layers of polystyrene foam and polyester resin.

It is known to produce laminar structures of the aforesaid type by coating a sheet of polystyrene foam on both sides with a copolymerisable mixture of an unsaturated polyester and vinyl acetate. However, in order that it should not attack the polystyrene, the mixture must be copolymerised at a fairly low temperature, generally not exceeding about 30° C., which necessitates a long period of polymerisation and keeping the mould in use for a long time.

It has now been found that it is possible greatly to reduce the attack of the polystyrene foam in the production of such laminates and to copolymerise the said mixture at temperatures up to about 65° C., and therefore much more rapidly, if there is added to the mixture a small proportion of an aliphatic or aromatic aldehyde.

According to the present invention, therefore, there is provided a process for the production of a laminar structure comprising at least one layer of polystyrene foam and at least one layer of a copolymer of an unsaturated polyester and vinyl acetate, which comprises coating at least one surface of a polystyrene foam sheet with a layer of a copolymerisable mixture containing an unsaturated polyester, vinyl acetate and a small proportion based on the weight of the mixture of an aliphatic or an aromatic aldehyde and heating the resultant assembly to copolymerise the mixture.

If desired the layers of the copolymerisable mixture may be applied to the foam together with reinforcing material such as glass fibres. The reinforcing material may be included in the copolymerisable mixture or a layer of reinforcing material may be applied between two coating layers of the mixture. The proportion of the aldehyde used in the new process is preferably from 1% to 5% of the weight of the copolymerisable mixture. Examples of suitable aldehydes are acetaldehyde, propionaldehyde, butyraldehyde, hexanal, n-heptanal and benzaldehyde.

The heating of the final assembly to achieve polymerisation is preferably conducted between 40° and 70° C.

The copolymerisable mixture preferably contains from 10 to 30 parts by weight of monomeric vinyl acetate and from 90 to 70 parts by weight of a polyester, the total of these two ingredients being 100 parts by weight. The polyester is preferably one obtained by esterifying an $\alpha,\beta$-unsaturated dicarboxylic acid, such as fumaric acid, maleic acid or itaconic acid, with a diol such as ethylene glycol, or propylene glycol. A part of the unsaturated acid may be replaced by an ethylenically saturated acid such as adipic acid, phthalic acid or chlorendic acid.

The following example, in which the parts and percentages given are by weight, will serve to illustrate the invention.

*Example*

An unsaturated polyester is prepared by heating, with concomitant liberation of water, a mixture of 34.2 parts of propylene glycol, 8.6 parts of diethylene glycol and 55.1 parts of fumaric acid. On completion of the condensation, there are added to the product 20 parts of monomeric vinyl acetate and 2% of acetaldehyde based on the weight of the solution.

There is then added to the mixture obtained 1% of a 50% solution of methyl ethyl ketone peroxide in methyl phthalate and 0.2% of a solution of cobalt octoate in butyl phthalate containing 6% of cobalt. A layer of the resultant solution is immediately coated on to a slab of polystyrene foam and there are then successively applied to the coating a layer of glass fibre "mat," a further layer of the resin solution and finally, as a mould platen, a plate of glass or metal coated with a mould release agent. The assembly is then heated for 1 hour at 40° C. and then for 1 hour at 70° C. whereupon a completely satisfactory assembly is obtained having good adhesion between the various layers.

Similarly satisfactory results are obtained if the heating operation is conducted for only half an hour at 60° C. followed by half an hour at 70° C. The acetaldehyde used in the above example may be replaced by propionaldehyde, n-butyraldehyde, n-heptanal or benzaldehyde with similar results.

In comparison experiments, the same procedure as described in the foregoing example was followed, except that the aldehyde was omitted and the assembly was heated either to 30° C. for less than 24 hours and thereafter to 60° C., or, in a second experiment, was heated to 40° C. and completed at that temperature. In both cases the polystyrene was attacked by the vinyl acetate and the laminates ruptured at the polystyrene-polyester interface. In order to obtain a satisfactory laminate from these comparison assemblies, it was found necessary to effect the initial stage of the polymerisation at 30° C. for at least 24 hours. Only after that was it possible to complete the polymerisation at a higher temperature, for example for 1 hour at 60° C. If the assembly was brought too rapidly to a temperature above 30° C., in order to accelerate the operation, the polystyrene was attacked by the vinyl acetate and the polyester would not adhere to it.

We claim:
1. A process for the production of a laminar structure comprising at least one layer of polystyrene foam and at least one layer of a copolymer of an unsaturated polyester and vinyl acetate, which comprises coating at least one surface of a polystyrene foam sheet with a layer of a copolymerisable mixture containing from 90 to 70 parts by weight of an unsaturated polyester of an $\alpha,\beta$-unsaturated acid and a diol, from 10 to 30 parts by weight of vinyl acetate, the total of these ingredients amounting to 100 parts by weight, and 1 to 5% based on the weight of the mixture of an aldehyde selected from the class consisting of acetaldehyde, propionaldehyde, butyraldehyde, hexanal, n-heptanal and benzaldehyde, and heating the resultant assembly to a temperature within the range 40° to 70° C. to copolymerise the mixture.

2. A process according to claim 1 wherein the said mixture includes a reinforcing material.

3. A process according to claim 1 in which the polymerization is effected by heating the assembly in at least two successive stages, the first stage being at about 40° C. and the last stage being at about 70° C.

4. A process for the production of a laminar structure comprising at least one layer of polystyrene foam and at least one layer of a copolymer of an unsaturated polyester and vinyl acetate, which comprises coating at least one surface of a polystyrene foam sheet with a layer of a copolymerisable mixture containing from 90 to 70 parts by weight of an unsaturated polyester which is a condensation product of an acid selected from the class consisting of fumaric, maleic and itaconic acids with a diol selected from the class consisting of ethylene glycol and propylene glycol, from 10 to 30 parts by weight of vinyl acetate, the total of these ingredients amounting to 100 parts by weight, and 1 to 5% based on the weight of the mixture of an aldehyde selected from acetaldehyde, propionaldehyde, butyraldehyde, hexanal, heptanal and benzaldehyde, applying to the resultant coating a layer of fibrous reinforcing material, applying thereon a further coating of the said copolymerisable mixture and heating the resultant assembly between 40 and 70° C. to copolymerise the mixture.

References Cited by the Examiner

UNITED STATES PATENTS

| | | | |
|---|---|---|---|
| 2,576,073 | 11/51 | Kropa et al. | 154—128 |
| 2,576,370 | 11/51 | Tawney | 260—73 |
| 2,616,887 | 11/52 | Danzig et al. | 260—73 |
| 2,721,879 | 10/55 | Popkin et al. | 260—78.5 |
| 2,817,619 | 12/57 | Bickel et al. | 154—110 |
| 2,865,800 | 12/58 | Stastny | 154—110 |
| 2,908,602 | 10/59 | Collardeau et al. | 154—128 |

FOREIGN PATENTS 580,524  9/46  Great Britain.

ALEXANDER WYMAN, *Primary Examiner.*

EARL M. BERGERT, CARL F. KRAFFT, *Examiners.*